United States Patent [19]

Shirn et al.

[11] 4,107,762

[45] Aug. 15, 1978

[54] SOLID ELECTROLYTE CAPACITOR PACKAGE WITH AN EXOTHERMICALLY-ALLOYABLE FUSE

[75] Inventors: George A. Shirn, Williamstown; John P. Maher, Adams, both of Mass.

[73] Assignee: Sprague Electric Company, North Adams, Mass.

[21] Appl. No.: 797,206

[22] Filed: May 16, 1977

[51] Int. Cl.² .................. H01G 9/00; B01J 17/00
[52] U.S. Cl. .................... 361/433; 361/26; 361/32; 361/105; 361/275; 357/72; 357/51; 29/570
[58] Field of Search ............ 361/26, 32, 34, 105, 361/275, 433; 357/79, 74, 72, 51; 29/570

[56] References Cited

U.S. PATENT DOCUMENTS

| 3,027,502 | 3/1962 | Moriguchi | 357/79 |
| 3,236,976 | 2/1966 | Rayno | 361/275 |
| 3,783,506 | 1/1974 | Rehfeld | 357/79 |
| 3,882,324 | 5/1975 | Smolker et al. | 357/74 |
| 4,017,773 | 4/1977 | Cheseldine | 361/433 |

*Primary Examiner*—Andrew J. James
*Attorney, Agent, or Firm*—Connolly and Hutz

[57] ABSTRACT

A fuse for a solid electrolyte capacitor is made of two exothermically alloyable metals such as aluminum and palladium. The fuse has a series electrical connection with and a thermal connection to the capacitor body. A defective and overheated capacitor section results in abnormally high currents so that the fuse temperature is elevated by ohmic self-heating and/or by the flow of heat from the overheated body. When the alloying temperature of the fuse is reached, the temperature of the alloying fuse momentarily becomes very high and opens essentially along its entire length.

15 Claims, 8 Drawing Figures

SOLID ELECTROLYTE CAPACITOR PACKAGE WITH AN EXOTHERMICALLY-ALLOYABLE FUSE

BACKGROUND OF THE INVENTION

This invention relates to a fused solid electrolyte capacitor package and more particularly to such a package wherein the fuse is an exothermically alloyable bimetal member.

Electrolytic valve metal capacitors are most commonly employed as AC filters being connected across a low impedance DC power bus. When a defect occurs in the dielectric film of the solid electrolyte capacitor, abnormally large currents tend to flow which may heat the porous valve metal anode to very high temperatures. Fault currents flowing in a shorted solid electrolyte tantalum capacitor frequently raise the temperature of the tantalum anode to a self sustaining combustion temperature which in turn may cause violent and severe damage to neighboring electronic components.

The problem of fusing a solid electrolyte capacitor is particularly difficult to solve. It has been found that wire fuses made of an elemental metal or of an alloyed metal may be employed in a solid electrolyte capacitor package and may work satisfactorily only when the fault current is due to a thoroughly shorted capacitor and is thus very high. But it has also been found that when moderate fault currents are present, a high melting metal fuse, e.g. nickel melting at 1400° C, may become hot long enough prior to melting so as to itself cause the capacitor body to ignite.

On the other hand, a medium temperature melting fuse wire (e.g. a cadmium-silver alloy melting at about 350° C) will melt at moderate fault currents but will remain confined as a continuous molten strand within the organic encapsulant cavity so that it does not open the circuit. A cavity in the housing may be provided adjacent the low melting fuse to overcome the above-mentioned confinement problem, only with additional manufacturing difficulty and higher costs.

It is accordingly an object of this invention to provide a simple fail-safe fusing feature in a solid electrolyte capacitor package.

SUMMARY OF THE INVENTION

A fused capacitor package includes a solid electrolyte capacitor body having two terminals, a housing enclosing the body, and two leads extending to the outside of the housing. A fuse having a series electrical connection between one of the body terminals and one of the external leads is incorporated within the package. The other terminal is connected to the other lead. The fuse consists of two exothermically alloyable elements in intimate contact with each other and it is thermally connected to the capacitor body. The body and the fuse may be encompassed by an organic resin encapsulation that may serve as at least a portion of the housing and may additionally provide a major part of the thermal connection between the fuse and the body.

It is preferred that each metal fuse element be a solid elongated piece such as a ribbon with the intimate contact extending along the lengths of the elements. One or both of the metal elements may be powder compacts rather than a solid unitary piece. Also the fuse may consist of a homogeneous mixture of particles of one and particles of the other of the two metal elements.

The term kindle as used herein means to initiate alloying of the exothermically alloyable fuse member, leading to a self-sustaining progressive process of exothermic alloying which is characterized by a controlled sputtering and dispersion of molten alloy particles and essentially results in the total obliteration of the fuse. Thus in the package of this invention a low thermal conductivity path between the capacitor body and one region of the fuse (e.g. a solder joint between a fuse end and the counterelectrode) provides the means by which the overheated body may kindle and obliterate essentially the entire fuse. The fuse will be caused to open when the partially shorted body approaches its ignition temperature even though the fault current flowing in the fuse may be insufficient to kindle the fuse by self-heating.

On the other hand when the body is more fully shorted, a very large fault current flows in the fuse while only a small amount of heat is generated in the fully shorted body. A portion of the fuse having the least conductive thermal path to heat sinking objects (e.g. the relatively cool capacitor body) reaches a temperature greater than any other portion of the fuse, and this portion of the fuse is kindled by self heating due to the large fault current.

The low to moderate capacitor fault current conditions for which the fuse is desirably capable of preventing hazardous conditions or violent consequences, requires that the fuse directly detect the temperature of the defective capacitor body and open the current before the capacitor body reaches its ignition temperature. A bare porous tantalum body in air without a dielectric oxide layer formed thereon will ignite when its temperature reaches about 400° C. A porous tantalum body having been formed at about 20 volts will ignite when the body temperature reaches around 500° C. For thicker oxide films formed at higher voltages and/or for completed solid electrolyte tantalum capacitor bodies, the ignition temperature is higher yet and may reach 700° to 800° C. It is clearly desirable that the kindling temperature of the alloyable fuse be lower than the ignition temperature of the complete capacitor body in order that protection against ignition may be provided solely through the direct thermal sensing by the fuse of the capacitor body temperature. Completed low voltage (e.g. 6V.) solid electrolyte tantalum capacitor bodies have been found to ignite at well above the 650° C kindling temperature of an aluminum-palladium fuse.

It is also preferred that the kindling temperature of the fuse in the package of this invention be greater than about 300° C to avoid kindling the fuse when the capacitor package is being soldered into a circuit. A well known commercial test to which such capacitors are subjected to determine their ability to withstand the soldering operation, consists of exposure to a temperature of 360° C for 3 minutes without degradation of the capacitor package properties. Even higher test temperatures are anticipated in the future. It is therefore preferred for a more universal use that the kindling temperature of the alloyable fuse be greater than about 400° C.

The exothermically alloying fuse of this invention is also capable of overcoming the above noted liquid melt confinement problem. It abruptly alloys when it reaches a characteristic alloying temperature and it momentarily becomes very much hotter which burns away some of the adjacent organic encapsulant and very quickly opens the series circuit that includes the faulty or shorted capacitor body. Also when the fuse is located near an outer surface of the encapsulant, it will advantageously burn through this region of the encapsulant making identification of the defective capacitor package readily apparent.

It should be noted that the amount of heat generated during alloying is directly proportional to the mass of the fuse. This heat is in effect stored chemical energy that is released when the fuse is kindled. The mass of the fuse is selected so that its stored chemical energy is less than sufficient to raise the temperature of the capacitor body to its ignition temperature.

The characteristic kindling temperature of the exothermically alloyable fuse of this invention corresponds very nearly to the melting temperature of the lowest melting element of the two metal element fuse. The characteristic kindling temperature of an aluminum-palladium fuse is 650° C, approximately the melting point of aluminum. This invention also contemplates a fuse wherein the lowest melting element is an alloy whose composition is chosen to obtain the desired characteristic kindling temperature. In particular the eutectic alloy 70% Al 30% Mg has a melting temperature of 435° C, the aluminum alloys having lesser quantities of magnesium providing a continuous range of melting points from 660° to 435° C. Also a bi-metallic fuse of palladium and magnesium is advantageously strongly exothermic in alloying. Thus fuses combining palladium with various of the aluminum-magnesium alloys offer a broad range of kindling temperatures. Lower cost fuse pairs, employing only base metals, such as Al/Cu and Al/Ag, though being less exothermic at alloying may also be suitable.

It is important to recognize that a conventional melting fuse wire that is heated to its melting temperature consumes additional heat energy to change the solid metal into the liquid state (the latent heat of fusion). In contrast the alloyable fuse of this invention kindles immediately upon reaching its characteristic kindling temperature advantageously providing a fast response and reliable protection against ignition of the capacitor body under conditions of low or medium fault currents.

DESCRIPTION OF THE PREFERRED EMBODIMENTS

Figure 2:
FIG. 2 shows in end sectional view the fuse of FIG. 1 taken in plane 2—2.
Figure 1:
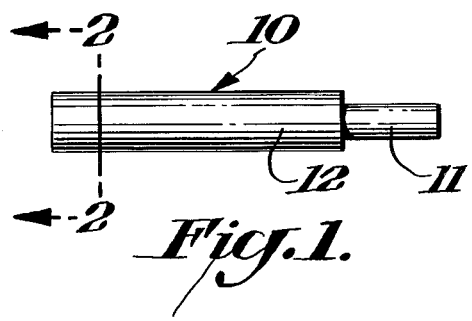
FIG. 1 shows in side view a bimetal exothermically alloyable fuse wire of this invention.
Figure 3:
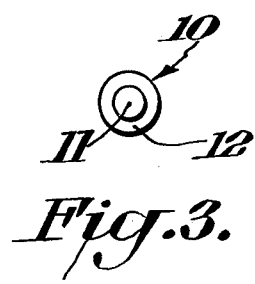
FIG. 3 shows in end view the fuse of FIG. 1.

A fuse wire 10 consists of an aluminum core wire 11 that is clad with a layer of palladium 12, as shown in FIGS. 1, 2 and 3. When any region of this clad fuse wire reaches a temperature of about 650° C (1200° F), an exothermic alloying of the two metals is initiated in that region and progressively moves along the entire clad regions of the wire. This exothermic reaction quickly raises the temperature of the alloying wire to temperatures on the order of 2800° C (5000° F) which results in melting of the alloy and immediate loss of physical stability and form. No oxygen is required for the reaction although when exposed to air during alloying the hot alloy particles or debris tend to oxidize and become insulative.

Figure 4:
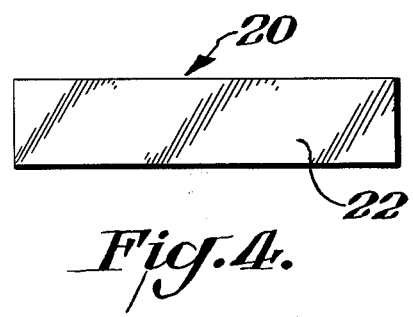
FIG. 4 shows in a top view a fuse strip of this invention.
Figure 5:
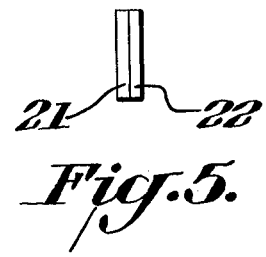
FIG. 5 shows in an end view the fuse of FIG. 4.

Referring to FIGS. 4 and 5, an exothermically alloyable fuse strip 20 consists of a ribbon of aluminum 21 and a ribbon of palladium 22. The initiation and progress of alloy fusing of the fuse strip 20 occurs in exactly the same manner as that of wire 10.

Figure 6:
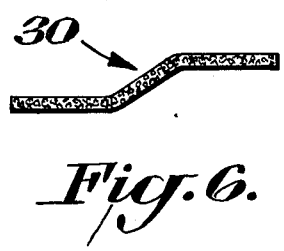
FIG. 6 shows in side sectional view a powder compact fuse of this invention.

Referring to FIG. 6, another bimetal fuse 30 that may be substituted for fuse wire 10 consists of a powder compact that includes a homogeneous mixture of particles of palladium and aluminum. The powder compact may be held together by an organic binder medium. It may be manufactured by extruding or molding a mixture of the metal particles in an organic binder solution, such as polyvinyl alcohol in a water vehicle. Preformed pieces, such as that shown in FIG. 6 may be dried to remove the vehicle and to provide a rigid fuse member of any convenient geometry for connection into a capacitor package.

Figure 7:
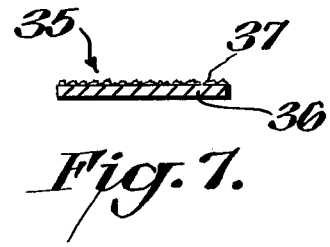
FIG. 7 shows in side sectional view a strip and powder fuse of this invention.

FIG. 7 illustrates yet another suitable alloyable fuse 35 having an aluminum ribbon 36 to which a layer of palladium particles 37 is bonded. The bond may be facilitated by means of an organic binder or by pressing the powder into the surface of the aluminum.

Figure 8:
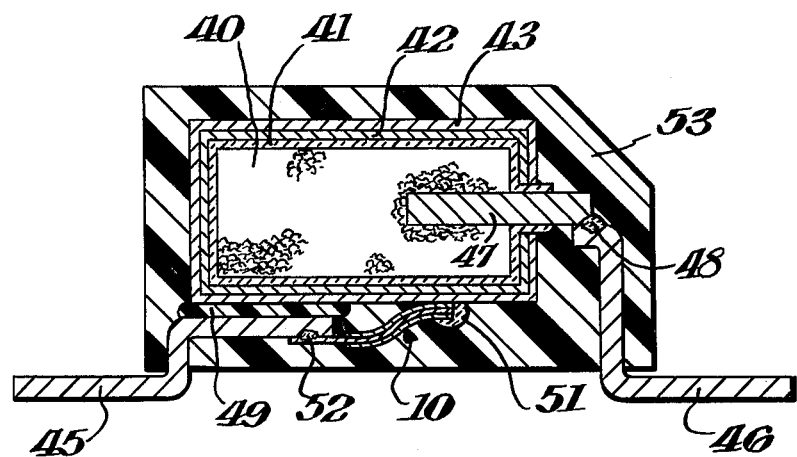
FIG. 8 shows in side sectional view a solid electrolyte capacitor package of this invention including the exothermically alloyable fuse of FIG. 1.

With reference to FIG. 8, a porous tantalum anode 40 has grown over all the anode surfaces a film of valvemetal oxide 41 that serves as the dielectric of the capacitor. The most commonly employed valve metal is tantalum and the present description herein refers to tantalum, it being understood that other valve-metals such as aluminum, titanium, niobium and the like may be substituted. Substantially filling the pores of the porous anode 40 and contiguous with the dielectric film 41 is a coating of manganese dioxide 42 that serves as the solid electrolyte of the capacitor. Disposed over the semiconducting manganese dioxide is a conductive counterelectrode layer 43 making ohmic contact thereto. The counterelectrode layer 43 may consist of a ' first sublayer of graphite (not shown) and a second layer of a solderable material such as a copper film, a tin/lead solder or a silver powder loaded resin. Typical of such units are those described in U.S. Pat. No. 2,936,514 issued on May 17, 1960 to R. J. Millard and U.S. Pat. No. 3,789,274 to W. Pfister and G. Shirn issued Jan. 29, 1974, which patents are assigned to the same assignee as the present invention.

Two metal strip leads 45 and 46 serve as the cathode lead and the anode lead, respectively. They have been bent, as shown, so that their outer extending ends lie in the same plane to provide a means for flush mounting the capacitor by soldering to electrical terminal pads on a planar printed wiring board.

The anode lead 46 is connected to the tantalum riser wire 47 by means of a weld 48. The cathode lead 45 is physically mounted to the counterelectrode anode body by a layer of insulating epoxy resin 49. Layer 49 also serves to insulate the counterelectrode 43 from the cathode lead wire 45.

A series electrical connection of the fuse wire 10 between the counterelectrode 43 and cathode lead 45 includes a solder connection 51 at the counterelectrode and a weld 52 at the cathode lead end. Alternatively, the palladium cladding 12 may be coextensive with the aluminum core 11 and a solder connection or a connection using a metal loaded resin may be made here.

The palladium clad aluminum fuse wire 10 has a diameter of 0.002 inch (0.005 cm.) and approximately equal amounts of palladium and aluminum by volume in the clad regions. The weld 52 is made in the unclad region or bare aluminum region of the fuse wire to prevent initiating exothermic alloying of the fuse wire during the welding step. The clad region of the fuse wire not embedded in solder connection 51 is 0.04 inch (1 mm) long and has a resistance of about 0.05 ohms.

The counterelectroded anode and the fuse wire are encompassed in an organic encapsulating resin 53 by a standard transfer molding process. This encapsulant provides protection to the capacitor body against physical and other environmental damage, provides substantial physical support to the leads, and may provide a broad thermal path between the counterelectroded anode and the central regions of fuse. The solder connection 51 provides in this structure a more substantial thermal connection between the capacitor body and the fuse.

A fault current passing through the valve metal anode and through the fuse heats both, and the two sources of heat raise the temperature of the fuse to that required to initiate kindling of the fuse metals before the anode temperature becomes high enough for the anode to ignite. The fuse metals are chosen such that the minimum temperature required to initiate alloying and kindle the fuse is less than and preferably substantially less than the ignition temperature of the valve metal anode.

What is claimed is:

1. A fused capacitor package including a solid electrolyte capacitor body having two terminals, a housing enclosing said body and two leads extending to the outside of said housing, wherein the improvement comprises a fuse made of two exothermically alloyable elements in intimate contact with each other; said fuse being enclosed by said housing, and being connected between one of said terminals and one of said leads, and thus having a series electrical connection with said body, the other of said leads being connected to the other of said terminals, said fuse having a thermal connection to said capacitor body.

2. The capacitor package of claim 1 wherein said housing is an encapsulating organic resin and said fuse is embedded in said resin.

3. The capacitor package of claim 1 wherein said two metal elements are of aluminum and palladium, respectively.

4. The package of claim 1 wherein the lowest melting of said two metal elements is an alloy.

5. The package of claim 4 wherein one of said elements is palladium and the other of said elements is an alloy of aluminum and magnesium.

6. The capacitor package of claim 1 wherein the characteristic kindling temperature of said fuse is greater than 300° C.

7. The package of claim 1 wherein each of said metal elements is an elongated piece, said intimate contact extending along the lengths of said elements.

8. The package of claim 7 wherein one of said metal elements extends beyond the region of said intimate contact and said series connection includes a weld at said extended portion of said one element.

9. The capacitor package of claim 7 wherein said intimate contact extends to one end of said fuse and said series connection includes a solder joint at said one end.

10. The capacitor package of claim 7 wherein the thermal conductivity of said thermal connection is greatest near one end portion of said fuse.

11. The capacitor package of claim 7 wherein one of said metal elements is a wire and the other of said metal elements is clad over said wire.

12. The capacitor package of claim 7 wherein each of said elongated elements is in the form of a ribbon.

13. The capacitor package of claim 1 wherein said fuse is a powder compact including a homogeneous mixture of particles of one and particles of the other of said two metal elements, respectively.

14. The capacitor package of claim 1 wherein one of said elements is in the form of a unitary piece and the other of said elements is a powder being bonded to a surface of said one element.

15. The capacitor package of claim 1 wherein said one terminal is the cathode counterelectrode of said body.

* * * * *